(12) United States Patent
Shimura et al.

(10) Patent No.: US 10,559,132 B2
(45) Date of Patent: Feb. 11, 2020

(54) DISPLAY APPARATUS, DISPLAY SYSTEM, AND CONTROL METHOD FOR DISPLAY APPARATUS

(71) Applicant: OLYMPUS CORPORATION, Hachioji-shi, Tokyo (JP)

(72) Inventors: Kazuhiko Shimura, Hachioji (JP); Kazuo Kanda, Hagashiyamato (JP); Yoshiyuki Fukuya, Sagamihara (JP); Nobuyuki Shima, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/797,715

(22) Filed: Oct. 30, 2017

(65) Prior Publication Data

US 2018/0122145 A1    May 3, 2018

(30) Foreign Application Priority Data

Oct. 31, 2016    (JP) .................. 2016-213061

(51) Int. Cl.
*G02B 27/01* (2006.01)
*G06T 19/00* (2011.01)
*H04N 5/232* (2006.01)

(52) U.S. Cl.
CPC ........ *G06T 19/006* (2013.01); *G02B 27/0172* (2013.01); *H04N 5/23293* (2013.01);
(Continued)

(58) Field of Classification Search
CPC ...... G02B 2027/0138; G02B 2027/014; G02B 27/0172; G06T 19/006; G06T 2219/004;
(Continued)

(56) References Cited

U.S. PATENT DOCUMENTS 9,819,911 B2 * 11/2017 K V ................... B64C 39/024
2005/0071046 A1 * 3/2005 Miyazaki ......... G08B 13/19645
700/245
(Continued)

FOREIGN PATENT DOCUMENTS

CN    103945117 A    7/2014
JP    2015-224982 A   12/2015

OTHER PUBLICATIONS

Office Action issued in corresponding Chinese Patent Application No. 201711030799.9 dated Feb. 2, 2019, consisting of 15 pp. (English Translation Provided).
(Continued)

*Primary Examiner* — Sing-Wai Wu
(74) *Attorney, Agent, or Firm* — Volpe and Koenig, P.C.

(57) ABSTRACT

A display apparatus includes an image acquisition unit to acquire a first image by imaging, an information acquisition unit to acquire first imaging range information including information on a first imaging, range of the imaging acquired by the image acquisition unit, and a communication unit, to perform communication to acquire, from an external device acquiring a second image by imaging, second imaging range information including information on a second imaging range of the imaging acquired by the external device. The display apparatus also includes a controller to acquire an area included in the first imaging range and the second imaging range as a corresponding range, and a display controller to generate display information indicative of the corresponding range, and a display to display the display information.

18 Claims, 14 Drawing Sheets

(52) U.S. Cl.
CPC ............... *G02B 2027/014* (2013.01); *G02B 2027/0138* (2013.01); *G06T 2219/004* (2013.01)

(58) Field of Classification Search
CPC ..... H04L 45/122; H04L 45/123; H04L 45/16; H04N 5/23293; H04W 40/00; H04W 84/12
See application file for complete search history.

(56) References Cited

U.S. PATENT DOCUMENTS

| | | |
|---|---|---|
| 2014/0204234 A1 | 7/2014 | Nonaka |
| 2016/0091720 A1* | 3/2016 | Stafford ............. G02B 27/0172 345/8 |
| 2017/0280103 A1* | 9/2017 | Burke .................... H04N 7/181 |
| 2017/0302856 A1* | 10/2017 | Noguchi .............. H04N 5/2258 |

OTHER PUBLICATIONS

Office Action issued in corresponding Chinese Patent Application No. 201711030799.9 dated Oct. 28, 2019, consisting of 15 pp. (English Translation Provided).

\* cited by examiner

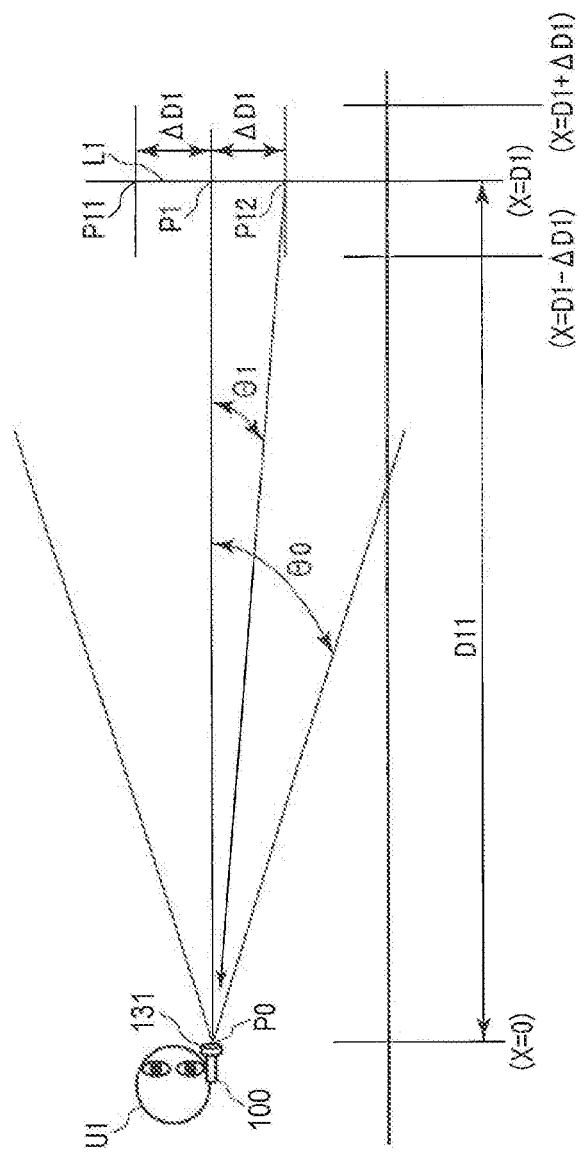
F I G. 6B

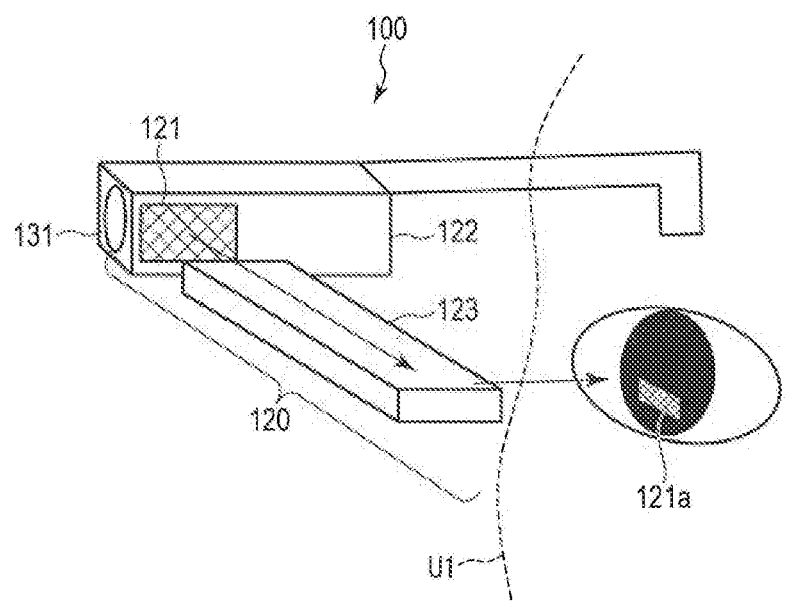
F I G. 10
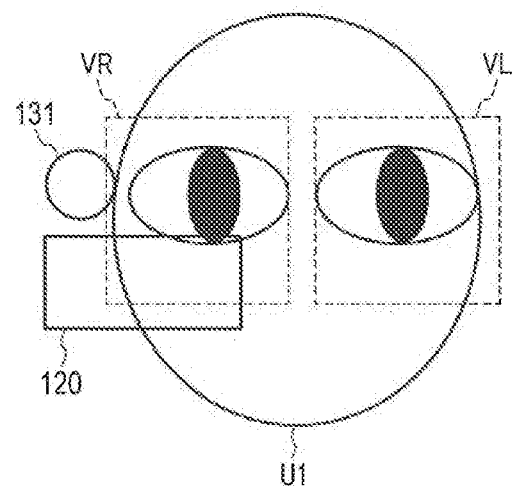
F I G. 11

DISPLAY APPARATUS, DISPLAY SYSTEM, AND CONTROL METHOD FOR DISPLAY APPARATUS

CROSS-REFERENCE TO RELATED APPLICATIONS

This application is based upon and claims the benefit of priority from the prior Japanese Patent Application No. 2016-213061, filed Oct. 31, 2016, the entire contents of which are incorporated herein by references.

BACKGROUND OF THE INVENTION

1. Field of the Invention

The present invention relates to a display apparatus, a display system, and a control method for the display apparatus.

2. Description of the Related Art

For example, Jpn. Pat. Appln. KOKAI Publication No. 2015-224982 discloses a technique related to a routing assistance apparatus enabling easy understanding of a positional relation between a geographical position and a current position of a thing or an event indicated by a virtual image referred to as an air tag based on an Augmented Reality (AR) technique in which the air tag is added to a video being imaged with a camera included in a portable apparatus so that the resultant video is displayed.

BRIEF SUMMARY OF THE INVENTION

According to one embodiment of the present invention, a display apparatus comprising an image acquisition unit configured to acquire a first image by imaging, an information acquisition unit configured to acquire first imaging range information including information on a first imaging range of the imaging acquired by the image acquisition unit, a communication unit configured to perform communication to acquire, from an external device acquiring a second image by imaging, second imaging range information including information on a second imaging range of the imaging acquired by the external device, a controller configured to acquire an area included in the first imaging range and the second imaging range as a corresponding range, a display controller configured to generate display information indicative of the corresponding range, and a display configured to display the display information.

According to one embodiment of the present invention, the above-mentioned display apparatus, and an external device configured to acquire a second image by imaging.

According to one embodiment of the present invention, a control method for a display apparatus comprising acquiring a first image by imaging, acquiring first imaging range information including information on a first imaging range of the imaging acquired by the imaging, performing communication to acquire, from an external device acquiring a second image by imaging, second imaging range information including information on a second imaging range of the imaging acquired by the external device, acquiring an area included in the first imaging range and the second imaging range as a corresponding range, generating display information indicative of the corresponding range, and displaying the display information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6B is a schematic diagram depicting an example of the method for acquiring the corresponding range according to the first embodiment;

FIG. 10 is a schematic diagram schematically depicting an exemplary configuration of a display apparatus according to the second embodiment;

FIG. 11 is a schematic diagram depicting an example of a positional relation between the user's field of vision and an image acquisition unit and a display provided in the display apparatus according to the second embodiment;

DETAILED DESCRIPTION OF THE INVENTION

First Embodiment

In connection with recent utilization of Information and Communications Technology (ICT), increasing attention has been paid to, for example, Internet of Things (IoT) devices including wearable terminals. The "ICT utilization" means, for example, utilization of environments and devices having an ever higher degree of freedom for information communication. The "IoT" indicates that all "things" are connected to the Internet or form parts of the Internet. The "IoT device" often refers to a device having a communication function and connected to a network not limited to the Internet. Examples of the wearable terminal include an eyeglass type and a wristwatch type. In recent years, many types of IoT devices have been equipped with a camera.

<Configuration of the Display System>

Figure 1:
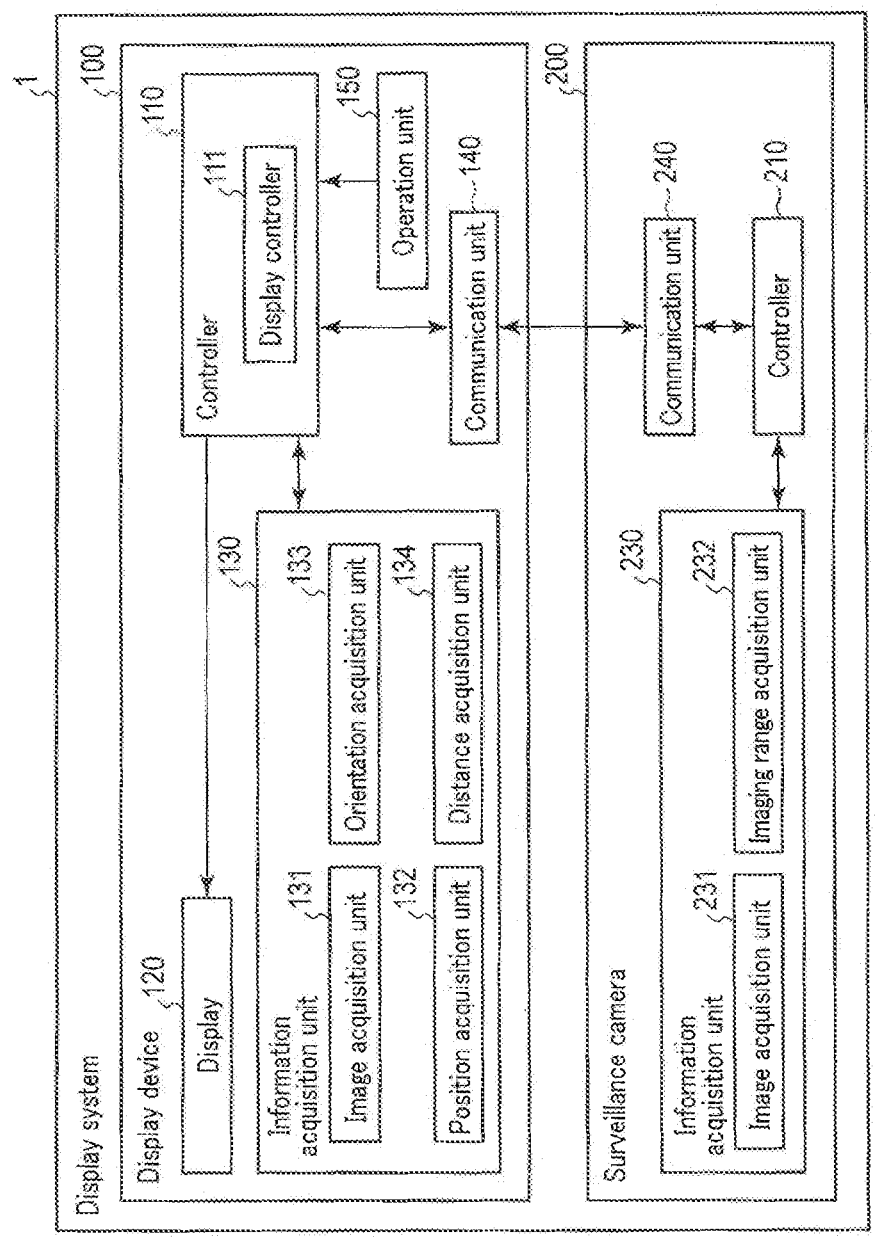
FIG. 1 is a block diagram schematically depicting an exemplary configuration of a display system according to a first embodiment.

FIG. 1 is a block diagram schematically depicting an exemplary configuration of a display system 1 according to the present embodiment. With reference to FIG. 1, the configuration of the display system 1 will be described which comprises a display apparatus 100 and a surveillance camera 200 included in an external device. From the above-described viewpoint, various kinds of devices included in the display system 1 according to the present embodiment, such as the display apparatus 100 and the surveillance camera 200, may be represented as IoT devices.

The display apparatus 100 comprises a controller 110, a display 120, an information acquisition unit 130, a communication unit 140, and an operation unit 150. The controller 110 controls operations of the units of the display apparatus 100. The controller 110 comprises a display controller 111. The display controller 111 generates display information which allows display of, for example, information acquired from the surveillance camera 200 via the communication unit 140. The display 120 displays images based on display information generated by the display controller 111. The display 120 comprises, for example, a liquid crystal display, an organic EL display, or a half mirror. The display displays images based on real images, and in order to visualize information acquired, displays a synthetic image resulting from synthesis of the image and the information such that the synthetic image is visible to the user. The synthesis may be performed electrically (electronically) or optically. The information acquisition unit 130 acquires information related to the display apparatus 100.

The information acquisition unit 130 comprises an image acquisition unit 131, a position acquisition unit 132, an orientation acquisition unit 133, and a distance acquisition unit 134. The image acquisition unit 131 comprises a first imaging unit comprising, for example, an imaging optical system and an image sensor to acquire, as a first image, an image based on a subject image formed on an imaging plane of the image sensor via the imaging optical system. Imaging performed by the first imaging unit is hereinafter described as first imaging. The position acquisition unit 132 comprises, for example, a GPS sensor or an atmospheric pressure sensor to acquire information on the position and elevation of the display apparatus 100. The orientation acquisition unit 133 comprises a sensor, for example an electronic compass to acquire the direction of the first imaging. The distance acquisition unit 134 acquires information on a distance between the display apparatus 100 and the surveillance camera 200. The distance may be acquired by distance measurement based on, for example, results of detection in distance measurement involved in image plane phase detection performed by the image sensor provided in the image acquisition unit 131. The distance may be acquired by the controller 110 through calculations based on an output from the position acquisition unit 132 and position information output by the surveillance camera 200. The distance measurement may be performed utilizing a light projecting radar, or triangulation or a contrast method based on focusing of lenses. When a distance between the display apparatus 100 and a particular object is measured, a particular index is provided which has a predetermined size so that distance measurement can be based on the detected size of the index. The distance measurement can also be performed based on, for example, difference between position information on an object and position information on the display apparatus 100 resulting from acquisition of signals or information from GPS or the like. Moreover, in some applications, distances may be measured with the eye and acquired through manual input. Information on the imaging range of the first imaging acquired by the information acquisition unit 130 or the units provided in the information acquisition unit 130 is hereinafter referred to as first imaging range information.

The communication unit 140 communicates with the surveillance camera 200. The communication may be wireless communication such as Bluetooth, Low Energy (BLE), or Wi-Fi, or wired communication. The communication may be performed via an electric communication line such as the Internet. The operation unit 150 comprises, for example, buttons, sliders, knobs, or dials to acquire the result of an operation by the user. The operation unit 150 may be a touch panel or may comprise a sensor which senses the user s action or line of sight to acquire the result of the operation.

The surveillance, camera 200 comprises a controller 210, an information acquisition unit 230, and a communication unit 240. The controller 210 controls operations of the units of the surveillance camera 200. The information acquisition unit 230 acquires information related to the surveillance camera 200. The information acquisition unit 230 comprises an image acquisition unit 231 and an imaging range acquisition unit 232. The image acquisition unit 231 comprises a second imaging unit comprising, for example, an imaging optical system and an image sensor to acquire, as a second image, an image based on a subject image formed on an imaging plane of the image sensor via the imaging optical system. Imaging performed by the second imaging unit is hereinafter referred to as second imaging. Among the external devices such as the surveillance camera 200 which are included in the display system 1, external devices having an imaging function are hereinafter referred to as imaging devices. The imaging range acquisition unit 232 comprises, for example, a GPS sensor to acquire information on an imaging range of the surveillance camera 200 as second imaging range information. The imaging range information includes, for example, a range corresponding to an angle of view determined by the position of the imaging device (in this case, the surveillance camera 200) or the orientation thereof during imaging (in this case, downward for simplification), or the size of the image sensor and the focal distance of the imaging optical system, or the like, or is integration of the range with other data. A part or all of the second imaging range information may be pre-stored on the surveillance camera 200, or may be acquired by determining what angle of view is set for the image acquisition unit 231, where the image acquisition unit 231 is oriented, or the like, according to the current situation, or may be acquired based on, for example, information obtained when the angle of view or the like is set. The communication unit 240 communicates with the communication unit 140 provided in the display apparatus 100.

Figure 2:
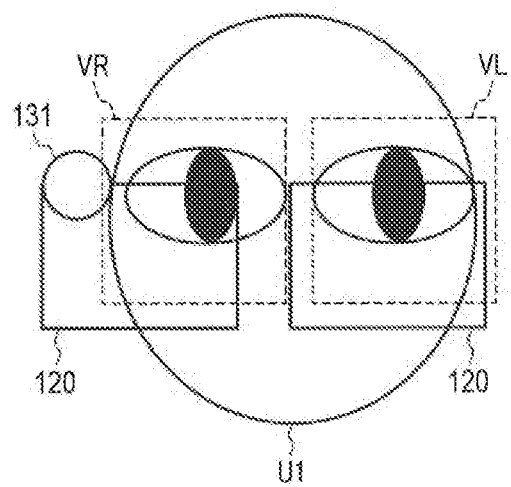
FIG. 2 is a schematic diagram depicting, an example of a positional relation between the user's field of vision and an image acquisition unit and a display provided in a display apparatus according to the first embodiment.
Figure 3:
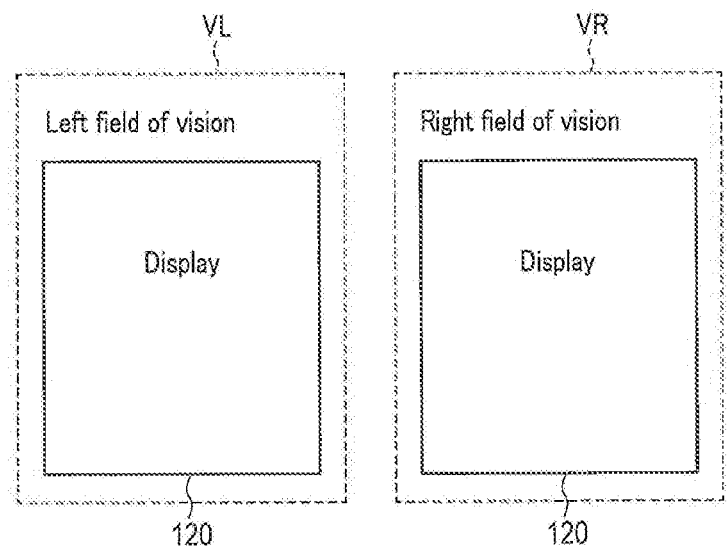
FIG. 3 is a schematic diagram depicting an example of a positional relation between a user's field of vision and the display according to the first embodiment.

FIG. 2 is a schematic diagram illustrating an example of a positional relation between a field of vision of a user U1 and the image acquisition unit 131 and display 120 provided in the display apparatus 100 according to the present embodiment. FIG. 3 is a schematic diagram illustrating an example of a positional relation between the field of vision of the user U1 and the display 120 according to the present embodiment.

In description of the present embodiment, the display apparatus 100 is, for example, an eyeglass-type wearable terminal as depicted in FIG. 2. However, the present embodiment is not limited to this. The display apparatus 100 may be, for example, a wristwatch-type wearable terminal. Furthermore, the display apparatus 100 need not be a wearable terminal but may be any terminal having a display function, a communication function, and an imaging function. This is because whether or not the device (terminal) is wearable depends on whether or not the device is worn on the user's body in a hands free state and because, in this case, the user may hold the device by the hand to establish a state similar to a state where the device is worn on the user's body. If the device is wearable, the user can wear it, so the user need not hold a wearable device by the hand and may advantageously use both hands for another purpose. An eyeglass-type wearable device may be designed on the assumption of, for example, the height of the eyes of a common adult and a scene where the user checks a display image while walking. The eyeglass-type wearable device further advantageously facilitates control of the position of the display image visible to the user. This also allows simplification of control, design, and the like of the position of the eyes and the position of the display image (the position of the display image visible to the user). Of course, even if the device is not of the wearable type, various methods may be used to achieve control of the position visible to the user by controlling the display position. When the position of the eyes is allowed to coincide optically with the position of the display image, the relation between the position of the display image on the display and the position of the eyes may be detected by imaging the eyes from the display image so that the display position can be controlled based on the results of the detection. If images are electronically synthesized, the control can be achieved by adjusting the position of virtual information with respect to the position of the acquired image for display.

As depicted in FIG. 3, the display 120 provided in the display apparatus 100 according to the present embodiment is arranged so as to substantially overlap each of a right field of vision VR and a left field of vision VL of the user U1. The image acquisition unit 131 provided in the display apparatus 100 is arranged such that the line of sight of the user U1 coincides with the direction of the first imaging, for example, as depicted in FIG. 2. The display apparatus 100 may be of a virtual image projection type or a retinal projection type.

<Operations of the Display System>

Figure 4:
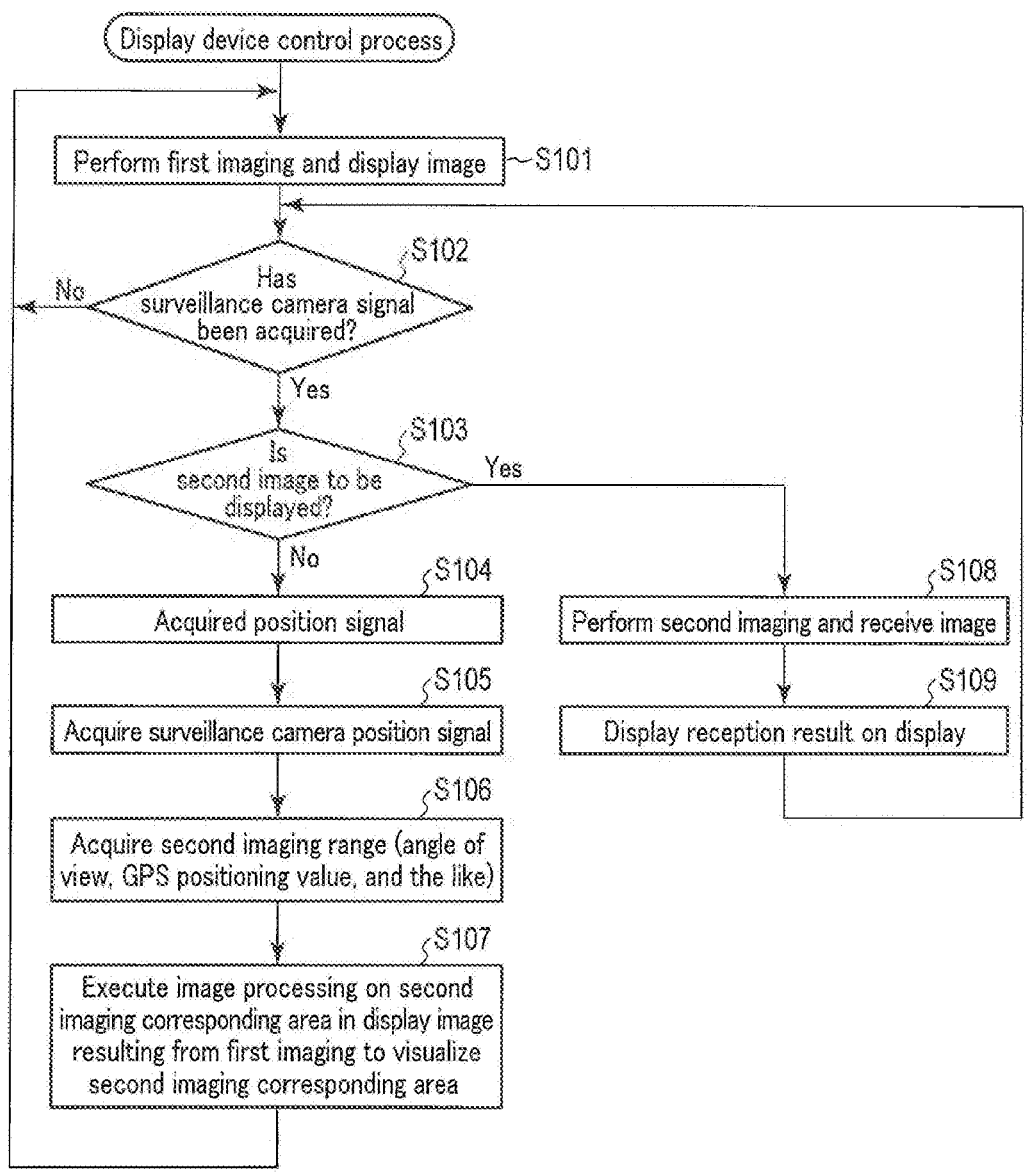
FIG. 4 is a flowchart illustrating an example of a display apparatus control process according to the first embodiment.
Figure 5:
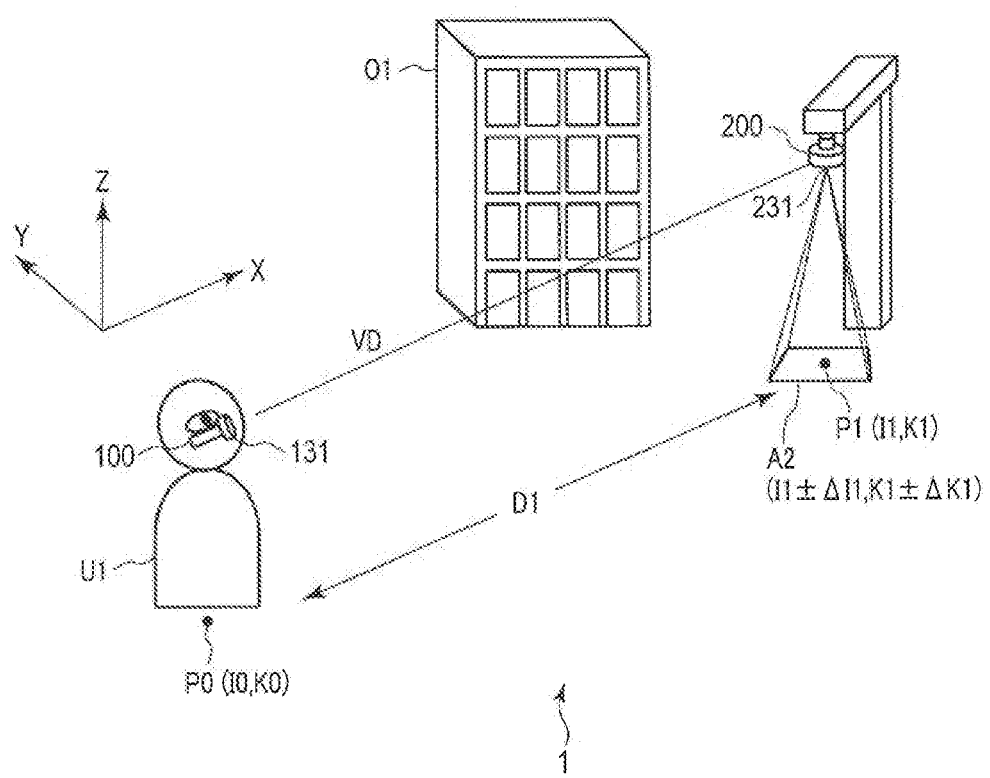
FIG. 5 is a schematic diagram depicting an example of a configuration of a display system according to the first embodiment.

FIG. 4 is a flowchart illustrating an example of a display apparatus control process according to the present embodiment. Operations of the display apparatus 100 will be described with reference to FIG. 4. FIG. 5 is a schematic diagram depicting an example of a configuration of the display system 1 according to the present embodiment. Operations of the display system 1 will be described, by way of example, for a case where the user U1 wearing the display apparatus 100 is on patrol as a security guard, for example, as depicted in FIG. 5. Expressions such as horizontal, vertical, and parallel which are described below do not require the exact horizontality, verticality, parallelism, or the like but may involve directions considered to be generally horizontal, vertical, parallel and the like. The following description includes a case where the directions considered to be generally horizontal, vertical, parallel, and the like are assumed to be horizontal, vertical, and parallel for simplification of description.

In step S101, the controller 110 acquires a first image by allowing the image acquisition unit 131 to perform the first imaging. The controller 110 further allows the display 120 to display the first image. Therefore, the user U1 can patrol while viewing live view display based on the first image, which is similar to the field of vision of the user U1.

In step S102, the controller 110 determines whether or not to acquire a signal output by the surveillance camera 200, for example, based on an output provided by the operation unit 150 in accordance with an operation of the user U1. For example, the user U1 performs an operation of acquiring the signal when desiring to check what object or place the surveillance camera 200 near a building O1 is displaying, or the like, as depicted in FIG. 5. The display apparatus control process proceeds to step S103 if the controller 110 determines that the signal is to be acquired, or returns to step S101 to continue live view di splay if the controller 110 determines that the signal is not to be acquired.

Such information acquisition on may be executed, for example, in accordance with particular rules established through standardization. For example, when a signal format, communication standards, and the like for transmission and reception of information are defined through standardization, the present technique can be utilized regardless of the combination of the wearable terminal including the display apparatus 100 and the external device including the surveillance camera 200.

On the other hand, whether or not to acquire the information as described above may be determined based on interpretation of an external device signal by the wearable terminal. The interpretation in this case indicates that the wearable terminal analyzes the signal to determine specifications for the external device even if, for example, standards for communication between the wearable terminal and the external device are not defined. The wearable terminal need not store the specifications for all the external devices which can be combined with the wearable terminal but may make determination based on information stored on clouds such as databases created on the Internet, servers, or the like. Upon reading information from a database on the network, the wearable terminal may retrieve the information based on the position information on the wearable terminal or based on a signal originated by the external device. The signal originated by the external device comprises, for example, the individual identification number and product type of the external device and the position information on the external device.

The information acquisition as described above may be based on the wearable terminal's own origination of information. That is, the wearable terminal may be formed to request various types of information from the external device in order to acquire the information from the external device and the specifications therefor as described above. The wearable terminal may request the information at a timing when the user operates the terminal or when the wearable terminal is placed at a predetermined position or within a predetermined range. Alternatively, the external device may periodically or constantly originate information, or transmission and reception of information may be started when the wearable terminal receives the signal.

In step S103, for example, based on an output from the operation unit 150 corresponding to the user's operation, the controller 110 determines whether or not to acquire the second image acquired by the surveillance camera 200 to allow the display 120 to display the second image. For example, when desiring to check what the surveillance camera 200 is displaying, the user U1 operates operation buttons or the like which allow the above-described information acquisition and display to be performed in order to display the second image (the user U1 may constantly display the second image simply by approaching the relevant, position without performing any other operations), whereas, for example, when desiring to know the imaging range of the surveillance camera 200, the user U1 performs an operation different from the operation of allowing the second image to be displayed. Upon determining that a state has been established where the second image is to be displayed or an operation has been performed to allow the second image to be displayed, the display apparatus control process proceeds to step S108. Upon determining that the second image is not to be displayed, the display apparatus control process proceeds to step S104.

In step S104, the controller 110 acquires the position information on the display apparatus 100 from the position acquisition unit 132. In step S105, the controller 110 acquires, via the communication unit 140, the position information on the surveillance camera 200 output by the surveillance camera 200. Therefore, in step S104 and step S105, the controller 110 acquires coordinates (I0, K0) of a point P0 indicative of the position of the user U1 wearing the display apparatus 100 and coordinates (I1, K1) of a point P1 indicative of the position of the surveillance camera 200 as depicted in FIG. 5. Then, the controller 110 calculates a distance D1 between the point P0 and the point P1, for example, based on the coordinates of the point P0 and the coordinates of the point P1.

In step S106, the controller 110 acquires a signal output by the surveillance camera 200 and indicating the imaging range of the surveillance camera 200, via the communication unit 140 as the second imaging range information. The second imaging range information includes, for example, the angle of view at which the surveillance camera 200 performs imaging and a GPS positioning value related to the imaging range acquired by the surveillance camera 200 (or longitude and latitude information input at the time of installation of the surveillance camera 200). In this case, the orientation (inclination) is assumed to be a vertical direction (substantially perpendicular to the ground) for simplification. Such information is indicative of a range from a certain point to a certain point, and thus, group of pieces of longitude and latitude information may be used in order to eliminate the need to convert each piece of information. Therefore, if, for example, the imaging range of the surveillance camera 200 is rectangular as depicted in FIG. 5, the controller 110 acquires four coordinates (I1±ΔI1, K1±ΔK1) indicative of the vertices of a second imaging area A2

In the following description, for example, lengths corresponding to ΔI1 and ΔK1 indicated by the longitude and the latitude are both assumed to be ΔD1.

In step S107, the controller 110 executes image processing on an area of the first image which corresponds to the second imaging range. Before the image processing, the controller 110 acquires the first imaging range information including the angle of view of the first imaging unit provided in the display apparatus 100. The first imaging range information includes, for example, the position, elevation, orientation, inclination, and the like of the first imaging unit. The values of the information included in the first imaging range information may be preliminarily determined on the assumption that, for a wearable device such as an eyeglass type terminal, the elevation corresponds to the height of the eyes of a standing person who is looking straight ahead. The wearable device may be specified such that the user U1 views an auxiliary display image upon reaching a particular position. This also allows the position information to be simplified. Of course, a situation may be assumed where, if the user U1, at that position, checks a surveillance position (the imaging range of the surveillance camera 200), the orientation and the inclination have particular values. Also in this case, the types and amount of information needed can be reduced. The first imaging range information may include values corresponding to a situation at the time of the imaging in step S101 or may be acquired, for example, when the display apparatus 100 acquires position information in step S104. The controller 110 allows the display 120 to display the image subjected to the image processing.

Now, a method for acquiring an area of the first image which is subjected to the image processing will be described. The area is hereinafter referred to as a corresponding range. An example of a method in which the controller 110 according to the present embodiment acquires the corresponding range will be described with reference to schematic diagrams depicted in FIG. 6A and FIG. 6B. At this point of time, the following information has already been acquired: the distance D1 between the point P0 and the point P1, an angle of view $\Theta 0$ in a direction parallel to the horizontal direction and a vertical angle of view $\psi 0$ which angles are included in the first imaging range information, and a length ΔD1 included in the second imaging range information.

Figure 6A:
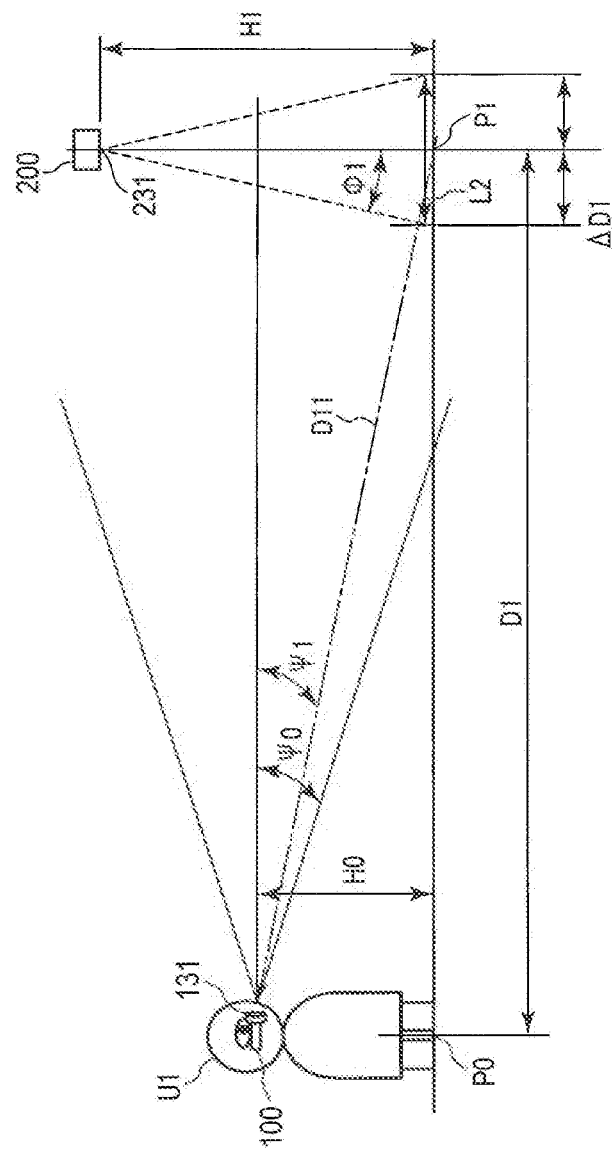
FIG. 6A is a schematic diagram depicting an example of a method for acquiring a corresponding range according to the embodiment.

Furthermore, in the following description, the user U1 wearing the display apparatus 100 on the head squarely faces the surveillance camera 200, and an imaging direction of the first imaging unit provided in the display apparatus 100 is parallel to the ground, by way of example, as depicted in FIG. 6A. Differences in height and position between the display apparatus 100 and the first imaging unit are known. The position of a point on the ground where the first imaging unit is located is denoted by P0. In the description below. A direction from the point P0 toward the point P1 is designated as an X+ direction, a direction orthogonal to the X direction and parallel to the ground is designated as a Y direction, and the point P0 is an origin in the X direction (X=0).

The controller 110 acquires a height H0 of the first imaging unit from the position acquisition unit 132. Based on the acquired height H0 and the distance D1, the controller 110 calculates a distance D11 between the first imaging unit and the point P1. The controller 110 calculates an angle of view ψ1 formed between the first imaging direction and a straight line with which the first imaging unit and the point P1 are connected together.

Therefore, which of the points included in the first image corresponds to the point P1 is clarified based on the calculated angle of view ψ1 and vertical angle of view ψ0. A point included in the first image and corresponding to the point P1 is hereinafter referred to as a point P1'.

A point P11 and a point P12 depicted in FIG. 6B are located at the same position as that of the point P1 in the X direction such that the distance between the point P1 and each of the points P11 and P12 is ΔD1. A segment with which the points P11 and P12 are connected together is referred to as a segment L1. That is, the segment may be represented as a part of a straight line extending in the Y direction and including the point P1 which part is included in the corresponding range. The schematic diagram in FIG. 6B depicts a plane defined by a straight line indicative of the distance D11 and the segment L1.

As depicted in FIG. 6B, the controller 110 calculates the angle of view Θ1 in the Y direction corresponding to the second imaging range, based on the distance D11 and the length ΔD1.

Therefore, for a straight line extending in the Y direction and including the point included in the first image, a part of the straight line which corresponds to the segment L1 is clarified based on the calculated angle of view Θ1 and the angle of view Θ0. A segment included in the first image and corresponding to the segment L1 is hereinafter referred to as a segment L1'.

As described above, information related to a part of the corresponding range in the Y direction at the position X=D1 is acquired. As described above, the controller 110 acquires the angle of view ψ1 and the angle of view Θ1 corresponding to the positions in the X direction within the range D1−ΔD1≤X≤D1+ΔD1, and determines which of the areas included in the first image corresponds to the corresponding range. If the second imaging range of the surveillance camera 200 is rectangular, then a similar corresponding range can obviously be calculated simply by calculating the corresponding range related to the four vertices of the second imaging range or the position X=D1±ΔD1 without calculating the corresponding range related to the position D1−ΔD1<X<D1+ΔD1. The corresponding range which can be acquired as described above may be represented as an area included in the first imaging range and the second imaging range. The corresponding range may also be represented as a visible image processing corresponding range, for example, when the direction of imaging performed by the first imaging unit is the same as or may be considered to be the same as the direction VD of the user's field of vision or may be treated as the same direction through correction or conversion.

Figure 7:
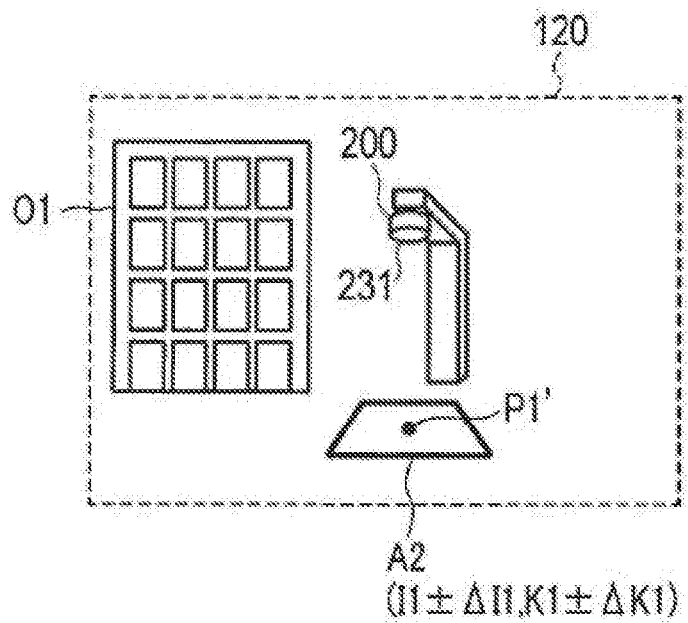
FIG. 7 is a schematic diagram depicting an example of a display image on the display in which the corresponding range is displayed in a superimposed manner according to the first embodiment.

FIG. 7 is a schematic diagram illustrating an example of image display on the display 120 according to the present embodiment resulting from image processing. The display controller 111 according to the present embodiment outputs display information used to display superimposed display image in which display information indicative of the corresponding range is displayed on the first image in a superimposed manner, to allow the display 120 to display the superimposed display image. As depicted in FIG. 7, an image in which the corresponding range indicating the second imaging area A2 is filled in as a result of image processing is displayed on the first image in a superimposed manner. The user U1 can visibly easily understand which of the areas the surveillance camera 200 near the building O1 is displaying.

Now, operations of the display system will be continuously described with reference to FIG. 4 again.

In step S108, the controller 110 acquires the second image from the surveillance camera 200 via the communication unit 140. In step S109, the controller 110 allows the display 120 to display the second image acquired in step S108. Subsequently, the display apparatus control process returns to step S102.

The display 120 provided in the display apparatus 100 according to the present embodiment substantially overlaps each of the right field of vision VR and the left field of vision VL of the user U1, and the user U1 may be on patrol while viewing the first image acquired by the image acquisition unit 131. In such a case, if the display 120 is suddenly allowed to display the second image, the view of the user U1 is suddenly blocked. Thus, to switch the image displayed on the display 120, the controller 110 may, for example, display the second image on the first image in a superimposed manner while gradually reducing the transparency of the second image. Alternatively, the controller 110 may allow the second image to be displayed on a part of the display 120.

Figure 8:
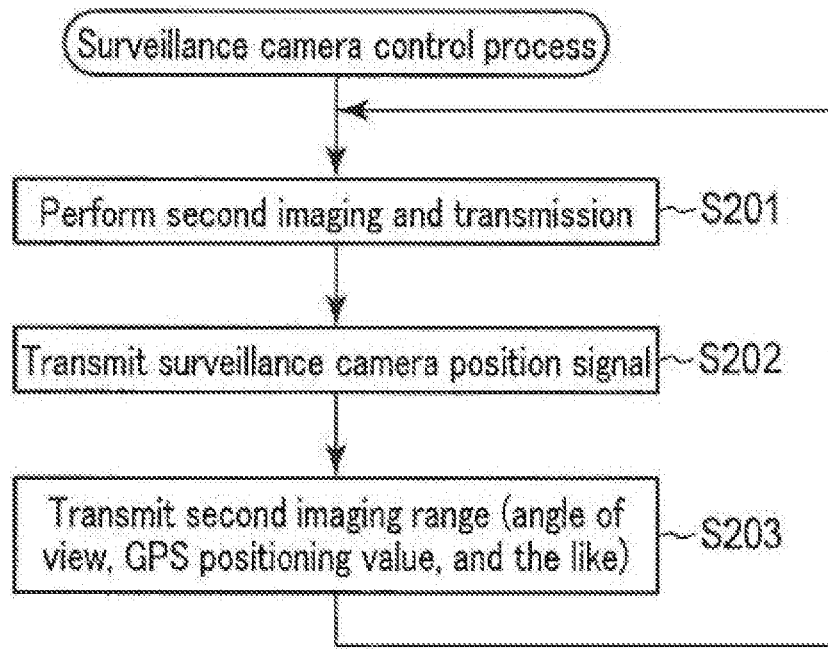
FIG. 8 is a flowchart illustrating an example of a surveillance camera control process according to the first embodiment.

FIG. 8 is a flowchart illustrating an example of a surveillance camera control process according to the present embodiment. Operations of the surveillance camera 200 will be described with reference to FIG. 8.

In step S201, the controller 210 allows the image acquisition unit 231 provided in the surveillance camera 200 to acquire the second image by imaging. The controller 210 allows the communication unit 240 to transmit the second image to the display apparatus 100. The present step is executed, for example, when the control signal transmitted in step S108 is received.

In step S202, the controller 210 allows the communication unit 240 to transmit a position signal indicative of the position of the surveillance camera 200 to the display apparatus 100. The position of the surveillance camera 200 may be pre-stored on the surveillance camera 200 or acquired by the controller 210. The present step corresponds to, for example, step S105.

In step S203, the controller 210 allows the communication unit 240 to transmit information related to the imaging range of the surveillance camera 200 as the second imaging range information. The second imaging range information includes, for example, the angle of view of the imaging unit provided in the image acquisition unit 231 of the surveillance camera 200, and the GPS positioning value. The present step corresponds top for example, step S106. Subsequently, the surveillance camera control process returns to step S201 to repeat the processing in step S201 to step S203.

<Modification of the Display System>

In the above-described present embodiment, the imaging unit provided in the display apparatus 100 squarely faces the surveillance camera 200, and the first imaging is performed in the direction parallel to the ground, by way of example. However, the present embodiment is not limited to this. For example, the information acquisition unit 130 detects possible inclination of the imaging direction with respect to the vertical direction or the lateral direction so that the above-described superimposed display can be provided with the orientation, the distance, and the like corrected based on the detected inclination. The imaging unit provided in the display apparatus 100 is configured such that the imaging direction of the first imaging is arranged to coincide with the direction of the line of sight of the user U1, for example, as depicted in FIG. 2. However, the present embodiment is not limited to this. Given that differences in relevant positions and directions are known or can be acquired, the superimposed display can be achieved with appropriate correction made by image processing or the like.

If, for example, the image sensor can detect a phase difference, the distance D1 may be calculated based on the phase difference. The point P1 indicative of the position of the surveillance camera 200 may be pre-stored on the surveillance camera 200 or acquired at each appropriate time by the surveillance camera 200.

The height H0 of the display apparatus 100 may be acquired through manual input or using an atmospheric pressure sensor, an elevation sensor, a GPS, or the like. Alternatively, for example, a value of the height H0 such as 150 cm and 160 cm may be preset based on average adult heights.

The value of the length ΔD1 may be, for example, calculated based on an angle of view Φ and a height H1 of the surveillance camera 200 pre-stored on the surveillance camera 200. Information from the surveillance camera 200 connected once to the display apparatus 100 can be recorded in the display apparatus 100. The technique according to the present embodiment is applicable to cases where the imaging range is not rectangular.

In the present embodiment, the distance D11 is calculated and used to calculate values needed for the superimposed display. However, when the angle of view ψ1 is sufficiently small, for example, when the point P0 and the point P1 are sufficiently distant from each other, the calculation may be executed on the assumption that D1≅D11 for simplification. Furthermore, when the first imaging unit is performing imaging in the horizontal direction and if the height H0 of the first imaging units known as is the case described in the present embodiment, the vertical angle of view ψ0 need not be used.

In the above-described present embodiment, a stationary external device such as the surveillance camera 200 continuously originates information by way of example. However, the surveillance camera 200 need not constantly originate signals, imaging range information or the like but may originate a signal or the like periodically or only when requested by the display apparatus 100. Moreover, the surveillance camera 200 may analyze the second image to originate a signal or the like upon detecting a change.

In the display system 1 according to the present embodiment, the imaging direction and a focal distance of the surveillance camera 200 may be variable, and the technique according to the present embodiment may allow the user to operate the display apparatus 100 to control operations of the surveillance camera 200.

The display system 1 according to the present embodiment displays the second imaging range information of the surveillance camera 200 on the first image acquired by the display apparatus 100, in a superimposed manner. Therefore, the use of the display system 1 according to the present embodiment allows the user U1 to understand visually easily the imaging range of the surveillance camera 200 or the image acquired by the surveillance camera 200, while viewing the display 120 provided in the display apparatus 100.

The application of the present technique allows the display apparatus 100 to acquire information from any surveillance cameras 200 through standardization of communication standards, utilization of databases created on the network, and the like. Similarly, the surveillance camera 200 can provide information to the user regardless of what display apparatus 100 the user uses.

The utilization of the display system 1 according to the present embodiment allows, for example, a user being on patrol as a security guard to visually easily understand whether or not any of the relevant areas fails to be monitored by the user. Moreover, the utilization of the present technique enables for example, an administrator of the surveillance camera 200 to allow, for example, a user with an access right granted through a particular procedure executed by a safety guard to check only a photographic range of the surveillance camera 200 even when the administrator does not desire to disclose images photographed by the surveillance camera 200 for privacy reasons or the like.

Second Embodiment

A second embodiment of the present invention will be described. Differences from the first embodiment will be described below. The same components are denoted by the same reference numerals, and description thereof is omitted.

Configuration of the Display System According to the Second Embodiment

Figure 9:
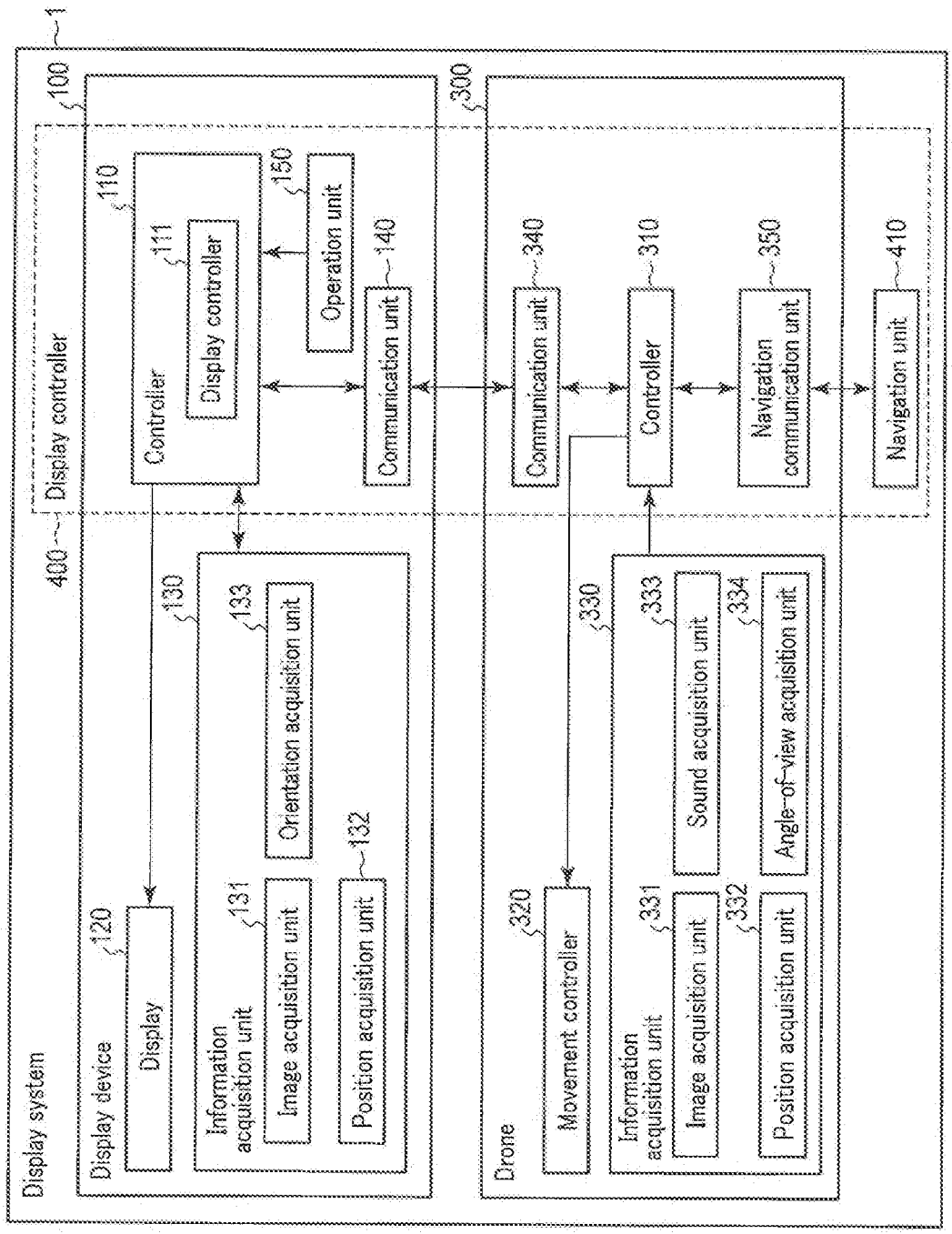
FIG. 9 is a block diagram schematically illustrating an exemplary configuration of a display system according to a second embodiment.

FIG. 9 is a block diagram schematically depicting an exemplary configuration of the display system 1 according to the present embodiment. The configuration of the display system 1 will be described with reference to FIG. 9.

In the first embodiment, the display system 1 comprising the display apparatus 100 and the stationary surveillance camera 200 has been described. In the present embodiment, a display system 1 will be described which comprises the display apparatus 100, a drone 300 which can perform imaging while flying, and a navigation unit 410 which allows the drone 300 to be navigated. Examples of the drone 300 include a small unmanned aerial vehicle, a particular aerial device, a model aircraft, and an unmanned aircraft.

The display apparatus 100 is configured similarly to the display apparatus 100 according to the first embodiment except for the lack of the distance acquisition unit 134 provided in the display apparatus 100 according to the first embodiment. The display apparatus 100 may comprise the distance acquisition unit 134, for example, if a distance from the drone 300 can be acquired in accordance with the image plane phase detection scheme.

The drone 300 comprises a controller 310, a movement controller 320, an information acquisition unit 330, a communication unit 340, and a navigation communication unit 350.

The controller 310 controls operations of the units of the drone 300. The information acquisition unit 230 acquires information related to the drone 300. The movement controller 320 performs control related to movement of the drone 300. The movement controller 320 includes, for example, a movement mechanism.

The information acquisition unit 330 comprises an image acquisition unit 331, a position acquisition unit 332, a sound acquisition unit 333, and an angle-of-view acquisition unit 334. The image acquisition unit 331 comprises a third imaging unit comprising, for example, an imaging optical system and an image sensor to acquire, as a third image, an image based on a subject image formed on an imaging plane of the image sensor via the imaging optical system. Imaging performed by the third imaging unit is hereinafter referred to as third imaging. The position acquisition unit 332 comprises, for example, a GPS sensor to acquire position information on the drone 300. The position acquisition unit 332 may comprise, for example, an altitude sensor and an orientation sensor to acquire the altitude, the moving direction, and the like of the drone 300. The sound acquisition unit 333 comprises for example, a sound pickup unit comprising a microphone to acquire sound data from the surroundings of the drone 300. The angle-of-view acquisition unit 334 acquires information on an angle of view involved in the imaging performed by the imaging unit provided in the image acquisition unit 331. For example, the imaging range of the drone 300 acquired by the information acquisition unit 330 is hereinafter referred to as a third imaging range. Information such as a position, an altitude, and an angle of view related to the third imaging range is hereinafter referred to as third imaging range information.

The communication unit 340 communicates with the communication unit 140 provided in the display apparatus 100. The navigation communication unit 350 communicates with the navigation unit 410 to acquire a control signal output by the navigation unit 410 to output the control signal to the controller 310.

The navigation unit 410 comprises, for example an operation unit which acquires the result of the user's operation to generate and output a control signal allowing the drone 300 to be operated in accordance with the operation of the user U1. The navigation unit 410 may be included in the display apparatus 100.

The display system 1 according to the present embodiment may comprise a display controller 400. The display controller 400 comprises, for example, the controller 110, the communication unit 140, and the operation unit 150, which are provided in the display apparatus 100, and the controller 310, the communication unit 340, the navigation communication unit 350, and the navigation unit 410, which are provided in the drone 410. The display controller 400 generates display information displayed on the display 120 provided in the display apparatus 100 of the display system 1.

FIG. 10 is a schematic diagram schematically depicting an exemplary configuration of the display apparatus 100 according to the present embodiment. In the description of the present embodiment, the display apparatus 100 is an eyeglass-type wearable terminal as depicted in FIG. 10, by way of example. As depicted in FIG. 10, the display apparatus 100 according to the present embodiment further comprise a display panel 121, a circuit housing unit 122, and a light guide unit 123. The display panel 121 displays images based on display information output by the display controller 111. The circuit housing unit 122 houses, for example, an electric circuit related to operations of the display apparatus 100. The light guide unit 123 guides light from the display panel to the pupils of the user U1. Therefore, the user U1 can view light from the display panel 121 via the light guide unit 123 as a display image 121a.

Figure 12:
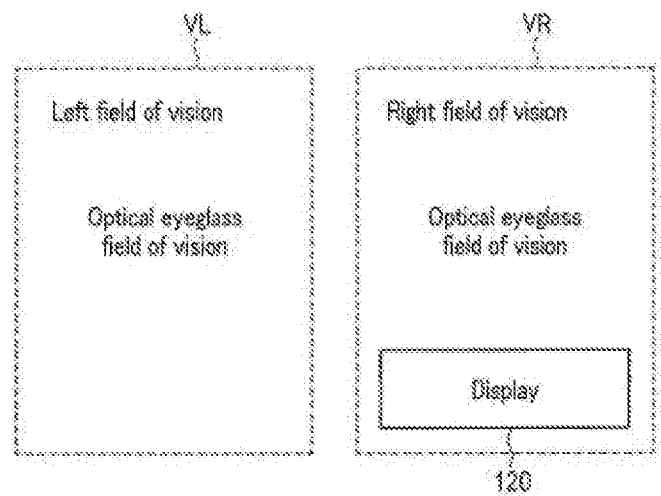
FIG. 12 is a schematic diagram depicting an example of a positional relation between the user's field of vision and the display according to the second embodiment.

FIG. 11 is a schematic diagram illustrating an example of a positional relation between the field of vision of the user U1 and each of the image acquisition unit 131 and the display 120 provided in the display apparatus 100 according to the present embodiment. FIG. 12 is a schematic diagram illustrating an example of a positional relation between the field of vision of the user U1 and the display 120. As depicted in FIG. 11, the image acquisition unit 131 provided in the display apparatus 100 is arranged such that the direction of the line of sight of the user U1 coincides with the first imaging direction, for example, as is the case with the display apparatus 100 according to the first embodiment depicted in FIG. 2. On the other hand, the display 120 is different in size, shape, and the like from the display 120 according to the first embodiment. The display 120 according to the second embodiment overlaps only a part of the field of vision of the user U1 as depicted in FIG. 12.

As described above, the display apparatus 100 according to the present embodiment displays a video in a bar-like optical system with a width which is, for example, approximately half of the pupil diameter. Thus, the user U1 can view the video displayed on the display 120 while maintaining a sufficient external field of vision. Moreover, light output by the display panel 121 is efficiently utilized, allowing bright screen display with reduced power consumption to be achieved.

<Summary of the Display System>

Figure 13:
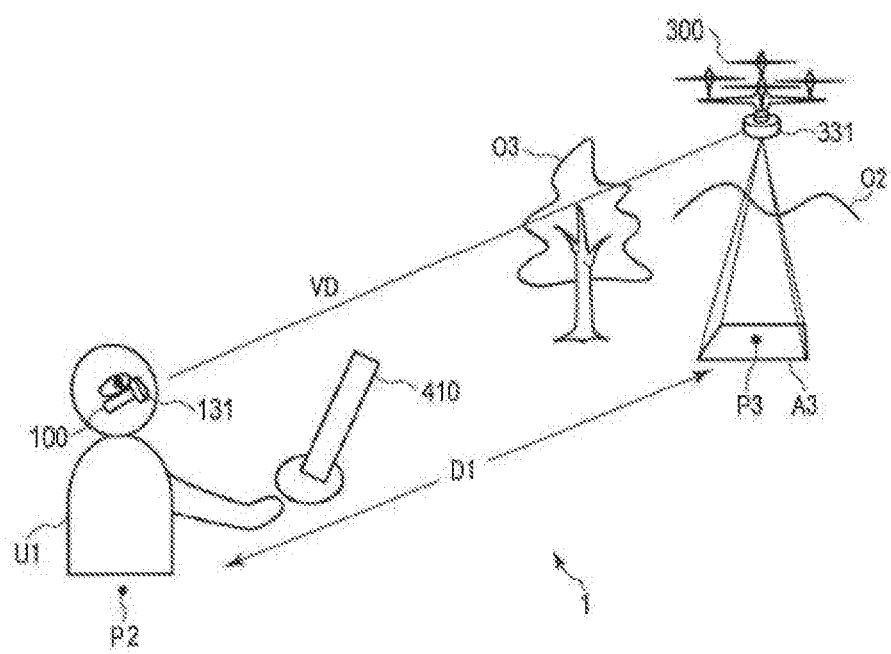
FIG. 13 is a schematic diagram depicting an example of a configuration of the display system according to the second embodiment.

FIG. 13 is a schematic diagram depicting an example of a configuration of the display system 1 according to the present embodiment. Now, as depicted in FIG. 13, the display system 1 according to the present embodiment will be described in brief in conjunction with a case where the user U1 wears the display apparatus 100 and holds the navigation unit 410 in the hand to navigate the drone 300, thus checking, for example, in a field in front of a mountain O2, how an agricultural crop near a tree O3 grows.

In the following description depicted in FIG. 13, the position of the user U1 is designated as a position P2 the position of the drone 300 is designated as a position P3, the imaging range of the drone 300 is designated as an imaging area A3, and the image acquisition unit 331 is arranged on a ground side of the drone 300 so as to allow a ground direction to be imaged. The arrangement of the image acquisition unit 331 and the imaging direction are not limited to the ground side but may be in the horizontal direction or on a sky side. The imaging direction may be variable.

Figure 14:
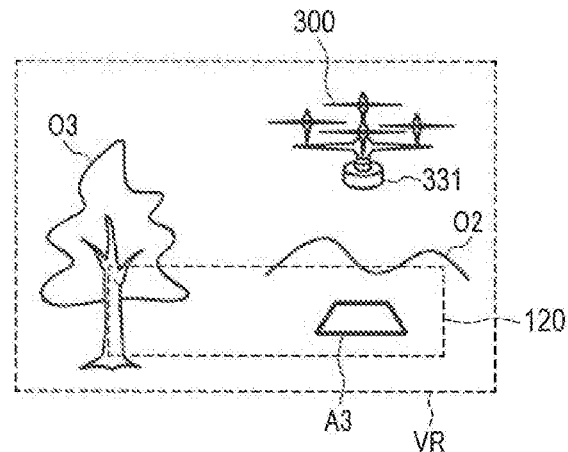
FIG. 14 is a schematic diagram depicting an example of a display image on the display in which the corresponding range is displayed in a superimposed manner according to the second embodiment.

For example, in conjunction with a case where the display system 1 according to the present embodiment is configured as described above, an exemplary image displayed on the display 120 provided in the display apparatus 100 will be described. FIG. 14 is a schematic diagram depicting an example of an image displayed on the display 120 and on which the corresponding range is displayed in a superimposed manner according to the second embodiment. The display system 1 according to the present embodiment acquires the field of vision of the user U1 based on the position, the orientation, and the like acquired by the display apparatus 100. Based on the information related to the field of vision and the third imaging range information including the position, the altitude, the angle of view, and the like of the drone 300, the display system 1 generates display information to be displayed, in a superimposed manner, on the display panel 121 provided within the field of vision of the user U1. As depicted in FIG. 14, the display information is information resulting from superimposed display of a display image indicating the third imaging range information on a part of a live view image acquired by the image acquisition unit 131 which part is blocked by the display 120. The live view display may, for example, be continuous with the field of vision of the user U1 as depicted in FIG. 14. Therefore, as depicted in FIG. 14, the user U1 can visually easily check the imaging range of the drone 300 while navigating the drone brought into the field of vision of the user U1.

FIG. 14 depicts a case where the boundary of the field of vision of the user U1 coincides with the boundary of the display image of the display 120 displayed on the field of vision in a superimposed manner. However, the present embodiment is not limited to this. The display system 1 according to the present embodiment may implement any display image so long as display information allowing the imaging range of the drone 300 to be determined is displayed on the field of vision of the user U1 in a superimposed manner.

Figure 15:
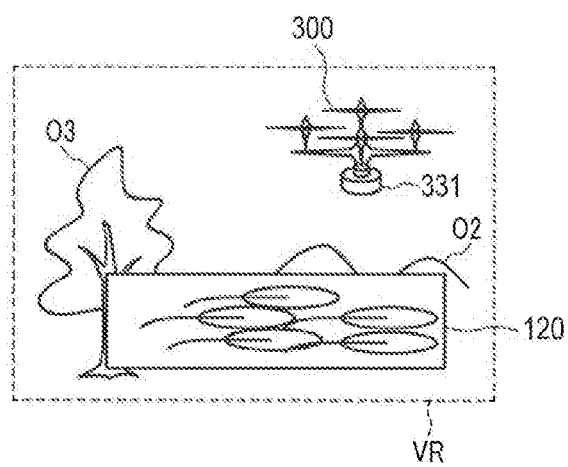
FIG. 15 is a schematic diagram depicting an example of a display image on the display in which an image acquired by a drone is displayed in a superimposed manner according to the second embodiment.

FIG. 15 is a schematic diagram depicting an example of a display image on the display in which an image acquired by the drone 300 is displayed in a superimposed manner according to the second embodiment. As depicted in FIG. 15, the third image acquired by the drone 300 may be displayed on the field of vision of the user U1 in a superimposed manner. In this case, the user U1 can visually easily check the image acquired by the drone 300 while navigating the drone 300 brought into the field of vision of the user U1. By switching the display image in FIG. 14 and the display image in FIG. 15 as needed, the user U1 can, for example, check how the agricultural crop grows and easily understand to which of the relevant areas the image corresponds.

<Operations of the Display System>

Figure 16:
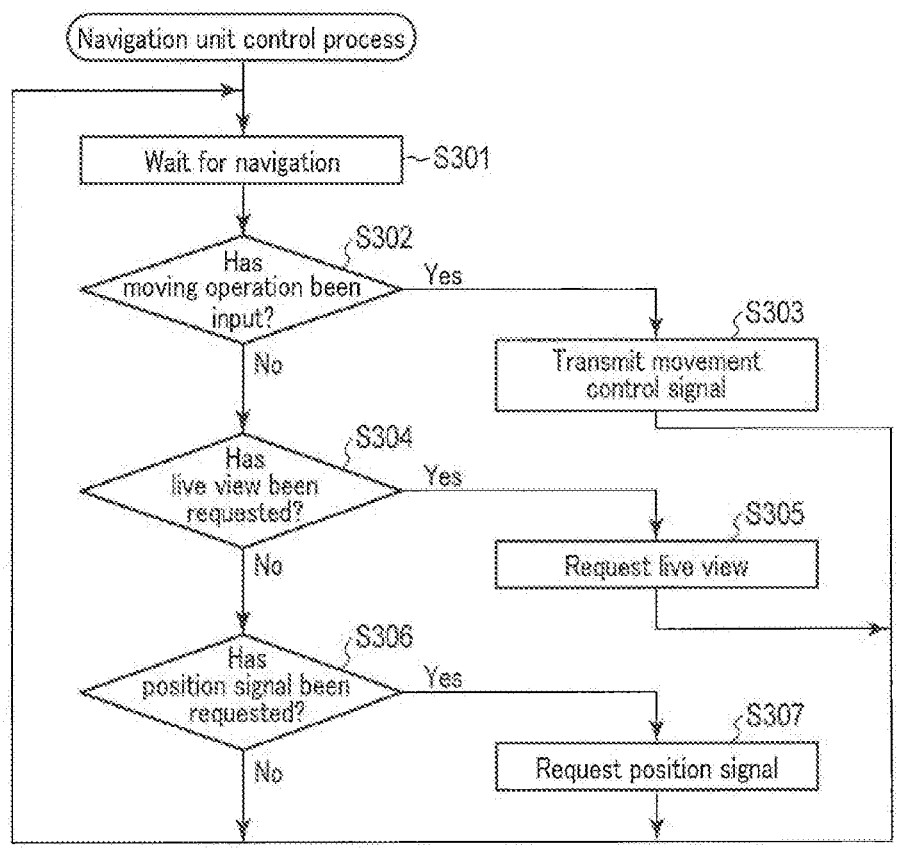
FIG. 16 is a flowchart illustrating an example of a navigation unit control process according to the second embodiment.

FIG. 16 is a flowchart illustrating an example of a navigation unit control process according to the present embodiment. Operations of the display system 1 will be described with reference to FIG. 16.

In step S301, the navigation unit 410 remains in a standby state, for example until the navigation unit 410 acquires the result of the user's operation. The navigation unit control process proceeds to step S302 when the user's operation is sensed.

In step S302, the navigation unit 410 determines whether or not the user operation acquired in step S301 is an operation of moving the drone 300. The navigation unit control process proceeds to step S303 is the result of the operation acquired by the navigation unit 410 is determined to correspond to a moving operation related to the drone 300, and proceeds to step S304 if the result of the operation is determined to correspond to any other operation. In step S303, the navigation unit 410 generates a movement control signal related to the acquired moving operation and corresponding to the result of the user's operation, and outputs the movement control signal to the navigation communication unit 350 provided in the drone 300. Subsequently, the navigation unit control process returns to step S301.

In step S304, the navigation unit 410 determines whether or not the user operation acquired in step S301 is an operation of requesting the live view display. The navigation unit control process proceeds to step S305 if the result of the operation acquired by the navigation unit 410 is determined to correspond to a request for the live view display, and proceeds to step S306 if the result of the operation is determined to correspond to any other operation. In step S305, the navigation unit 410 generates a control signal allowing the drone 300 to acquire the third image to transmit the image to the display apparatus 100, and outputs the control signal to the navigation communication unit 350 provided in the drone 300. Subsequently, the navigation unit control process returns to step S301.

In step S306, the navigation unit 410 determines whether or not the user operation acquired in step S301 is an operation of requesting the position information on the drone 300. For example, the user performs an operation of requesting the position information when desiring to know which of the relevant areas is being imaged. The navigation unit control process proceeds to step S307 if the result of the operation acquired by the navigation unit 410 is determined to correspond to a request for a position signal indicative of position information on the drone 300, and returns to step S301 to wait until the user performs an operation if the result of the operation is determined not to correspond to a request for the position signal. In step S307, the navigation unit 410 generates a control signal allowing the drone 300 to acquire the current position to transmit a position signal indicative of the position to the display apparatus 100, and outputs the control signal to the navigation communication unit 350 provided in the drone 300. Not only the position signal but also the information included in the third imaging range information may be requested Subsequently, the navigation unit control process returns to step S301.

Figure 17:
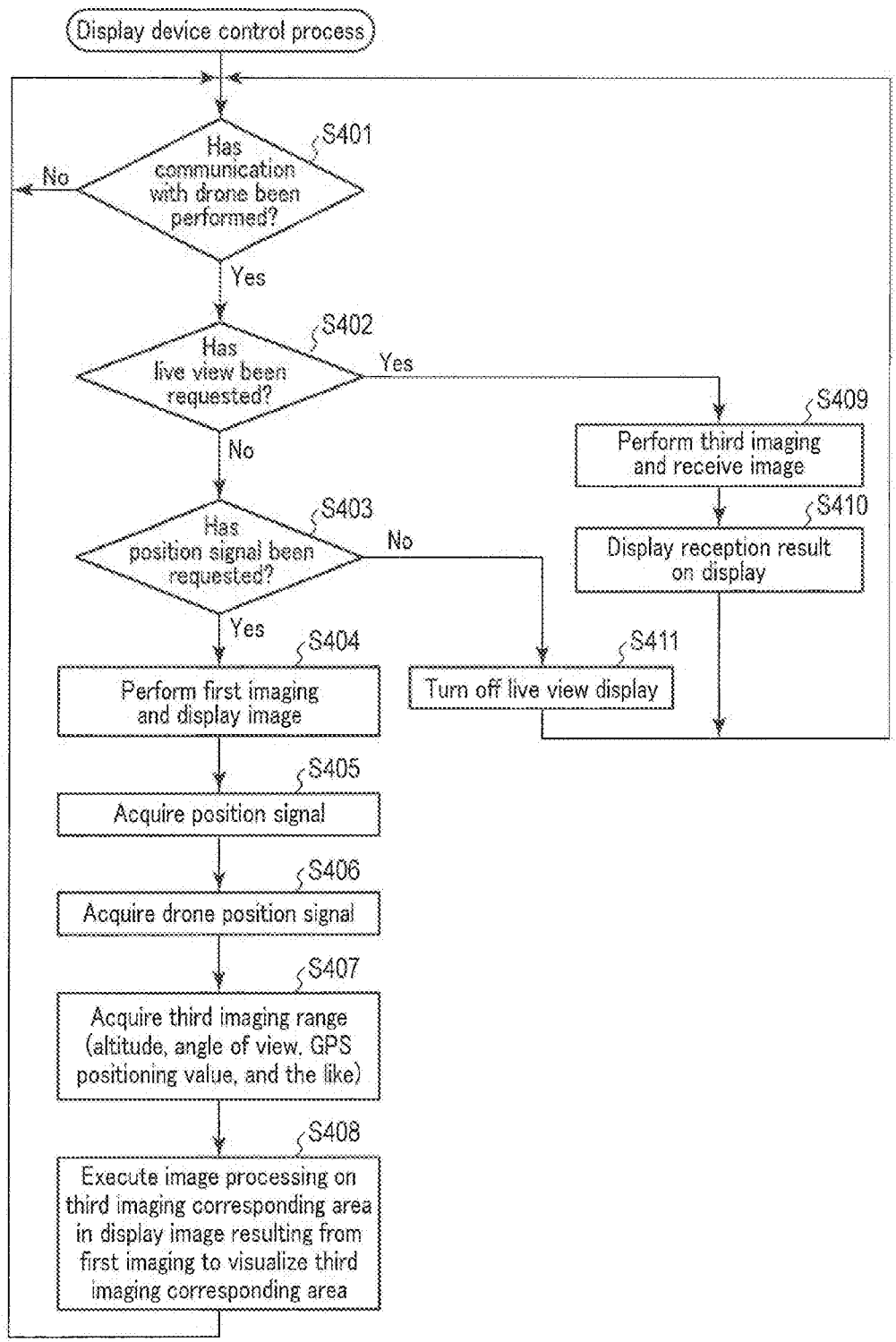
FIG. 17 is a flowchart illustrating an example of a display apparatus control process according to the second embodiment.

FIG. 17 is a flowchart illustrating an example of a display apparatus control process according to the present embodiment Operations of the display system 1 will be described with reference to FIG. 27.

In step S401, the controller 110 determines whether or not the navigation unit 410 has communicated with the drone 300. The display apparatus control process proceeds to step S402 if the navigation unit 410 is determined to have communicated with the drone 300, and returns to step S401 if the navigation unit 410 is determined not to have communicated with the drone 300. The present step corresponds to step S301 of the navigation unit control process.

In step S402, the controller 110 determines whether or not the navigation unit 410 requested the drone 300 to provide the live view. The display apparatus control process proceeds to step S403 if the controller 110 determines that the navigation unit 410 has requested the drone 300 to provide the live view, and otherwise proceeds to step S402. The present step corresponds to step S304 of the navigation unit control process.

In step S403, the controller 110 determines whether or not the navigation unit 410 has requested a position signal from the drone 300. The display apparatus control process proceeds to step S404 if the navigation unit 410 is determined to have requested the position signal, and otherwise proceeds to step S411. The present step corresponds to step S304 of the navigation unit control process.

In step S404, the controller 110 allows the image acquisition unit 131 to acquire the first image by imaging. The controller 110 allows the display 120 to display the first image. In step S405, the controller 110 acquires the position information on the display apparatus 100. In step S406, the controller 110 acquires the position information on the drone 300 via the communication unit 140. The present step corresponds to step S307 of the navigation unit control process.

In step S407, the controller 110 acquires the third imaging range information from the drone 300 via the communication unit 140. As described above, the third imaging range information includes information such as the altitude and the angle of view. The present step corresponds to S307 of the navigation unit control process.

In step S408, the controller 110 acquires information on the imaging range of the imaging unit provided in the image acquisition unit 131, as the first imaging range information. As described above with reference to FIG. 5 to FIG. 7, the controller 110 acquires an area included in the first imaging range and the third imaging range as a corresponding range, and determines which of the areas included in the first image corresponds to the third imaging range. If any appropriate corresponding range is found, the controller 110 subjects the area to image processing to generate display information allowing the third imaging range or the third image to be displayed on the first image in a superimposed manner. The controller 110 outputs the display information to the display 120 to allow the display 120 to display the information. Subsequently, the display apparatus control process returns to step S401.

In step S409, since the controller 110 has determined that the live view is requested by the user in step S402, the controller 110 acquires, via the communication unit 140, the third image acquired by the drone 300. The present step corresponds to step S305 of the navigation unit control process. In step S410, the controller 110 allows the display 120 to display the third image acquired in step S409 Subsequently, the display apparatus control process returns to step S401.

In step S411, since the controller 110 has determined that neither the live view display nor the positional signal is requested in step S402 and step S403, the controller 110 ends the image display provided by the display 120, such as the live view display. The wearable device such as the display apparatus 100 according to the present embodiment is desired to have minimized battery consumption due to a demand for weight reduction therefor, a hands free configuration thereof, and the like. Thus, processing such as in the present step is effective. Subsequently, the display apparatus control process returns to step S401.

Figure 18:
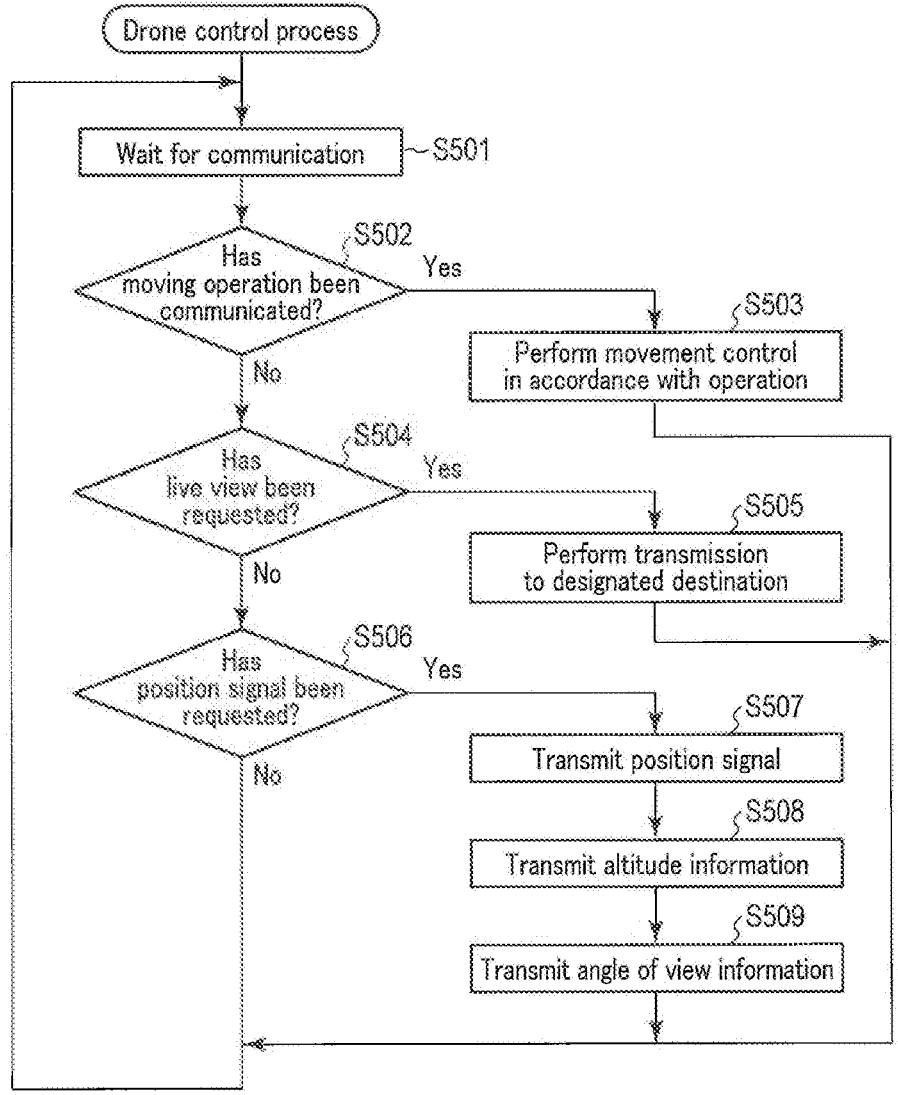
FIG. 18 is a flowchart illustrating an example of a drone control process according to the second embodiment.

FIG. 18 is a flowchart illustrating an example of a drone control process according to the present embodiment. Operations of the display system 1 will be described with reference to FIG. 18.

In step S501, the controller 310 waits until the controller 310 receives a signal from the navigation unit 410. The drone control process proceeds to step S502 when the controller 310 receives the signal.

In step S502, the controller 310 determines whether or not the control signal received from the navigation unit 410 is a control signal related to the moving operation for the drone 300. The drone control process proceeds to step S503 if moving operation communication is executed, resulting in reception of a moving operation signal, and proceeds to step S504 if the control signal is determined to be any other signal. The present step corresponds to step S302 of the navigation unit control process. In step S503, based on the movement control signal received from the navigation unit 410 via the navigation communication unit 350, the controller 310 outputs a control signal to the movement controller 320 to move the drone 300 in accordance with the result of the user's operation. Subsequently, the drone control process returns to step S501.

In step S504, the controller 310 determines whether or not the control signal received from the navigation unit 410 is a control signal related to the live view request. The drone control process proceeds to step S505 if the live view request has been received, and proceeds to step S506 if the control signal is determined to be any other signal. The present step corresponds to step S304 of the navigation unit control process. In step S505, the controller 310 transmits the third image acquired by the imaging unit provided in the image acquisition unit 331, to the display apparatus 100. For example, for reduced power consumption of the drone 300 or the display apparatus 100, instead of the configuration where the live view display is provided in accordance with the received live view request as in the present step, it will be considered that the controller 310 periodically acquires and analyzes the third image, and upon detecting a change or the like, provides a push notification to the display apparatus 100 to urge the display apparatus 100 to start live view display. Subsequently, the drone control process returns to step S501.

In step S506, the controller 310 determines whether or not the control signal received from the navigation unit 410 is a control signal related to the position signal request. The drone control process proceeds to step S507 if the position signal request is received, and returns to step S501 to wait until communication is started if the control signal is determined to be any other signal. The present step corresponds to step S306 of the navigation unit control process. In step S507, the controller 310 transmits the position information on the drone 300 acquired by the information acquisition unit 330, to the display apparatus 100. In step S508, the controller 310 transmits the altitude information on the drone 300 acquired by the information acquisition unit 330, to the display apparatus 100. In step S509, the controller 310 transmits the angle of view information on the drone 300 acquired by the information acquisition unit 330, to the display apparatus 100. The information transmitted to the display apparatus 100 in step S507 to step S509 is not limited to this, but the information included in the third imaging range information may be transmitted. Subsequently, the drone control process returns to step S501.

In the above-described present embodiment, the user U1 navigates the drone 300, by way of example. However, the drone 300 may be of an autonomous flight type. In this case, for example, the drone 300 may provide the push notification to the display apparatus 100 upon detecting a change as a result of analysis of the third image or may periodically originate the third imaging range information, the third image, or the like.

Alternatively, the display system 1 according to the present embodiment may be configured such that, for example, the acquired third image and the third imaging range information are recorded in the drone 300 so that, at any timing, the user can view any image and understand the position where the image was acquired. The pre-recorded third image may be displayed in a superimposed manner, for example, when the user U1 approaches the position where the image was acquired.

In addition to the advantages of the first embodiment, the display system 1 according to the present embodiment has the following advantages. The display system 1 according to the present embodiment displays the third imaging range information or the third image from the drone 300, on the first image in a superimposed manner. The display apparatus 100 according, to the present embodiment displays a video in the bar-like optical system with a width which is, for example, approximately half of the pupil diameter. Thus, the user can visually navigate the drone 300 while maintaining a sufficient external field of vision. Furthermore, the user can simultaneously view and check the third imaging range information or the third image from the drone 300 and the external field of vision.

The display apparatus 100 according to the present embodiment efficiently utilizes light output by the display panel 121, allowing bright screen display with reduced power consumption to be achieved. The display apparatus 100 according to the present embodiment can also avoid hindering the user's field of vision, eliminating the need to display constantly the first image as the live view display. The display apparatus 100 according to the present embodiment is thus useful in view of low power consumption and a reduced weight, which are needed for the wearable device and the like.

The display apparatus 100 according to the present embodiment may be combined with the surveillance camera 200 according to the first embodiment.

[Modification]

In the image processing related to the superimposed display, if, for example, the first image does not contain the imaging range of the external device such as the second imaging range or the third imaging range, that is, if no corresponding range is present, the processing may be omitted or image processing may be executed in which an auxiliary image indicating a direction in which the second or third imaging range in the first image lies with respect to the first imaging range depicted in the first image is displayed in a superimposed manner.

In the first embodiment and the second embodiment, the position information is acquired, for example, based on positioning values from a GPS sensor, by way of example. However, the present invention is not limited to this. The position information may be acquired, for example, from a base station for cellular phones or the like or an access point for a wireless LAN such as Wi-Fi. Furthermore, for an area imaged once, feature in the image may be recorded along with the position information so that the position information can be acquired by image processing based on the feature.

As depicted in FIG. 7 and FIG. 14, the superimposed display is provided such that a second imaging area A2 or a third imaging area A3 is filled in, by way of example. However, the present invention is not limited to this. Any superimposed display may be provided so long as the superimposed display clearly indicates which of the areas included in the first image corresponds to the second imaging area A2 or the third imaging area A3. For example, the second imaging area A2 or the third imaging area A3 may be indicated using a frame line, a segment, a figure, a character string, or the like. Moreover, the second image or the third image may be displayed in the corresponding area in a superimposed manner. In the description above, the superimposed display is provided on the first image. However, the first image need not necessarily be an image acquired by the image acquisition unit 131 but may be, for example, a map acquired by a unit other than the image acquisition unit 131.

In the first embodiment and the second embodiment, the second imaging range information from the surveillance camera 200 or the third imaging range information acquired by the drone 300 is superimposed on the first image acquired by the image acquisition unit 131 provided in the display apparatus 100, by ay of example. However, the present invention is not limited to this. For example, the first imaging range information acquired by the display apparatus 100 may be superimposed on the second image acquired by the surveillance camera 200 or the third, image acquired by the drone 300. For example, the user U1 may check the second image or the third image and consequently visit the place where the image was acquired. In such a case, the user U1 can visually easily understand which of the currently visible areas corresponds to the previously checked area in the image.

In the first embodiment and the second embodiment, the surveillance camera 200 and the drone 300 have been described as examples of the external camera included in the display system 1. However, the present invention is not limited to this. The display system 1 may comprise a self-propelled robot with an imaging function. Furthermore, in the above-described examples, the display apparatus 100 is the wearable device. However, the present invention is not limited to this. For example, similar effects can be exerted by using a smartphone, tablet PC, or the like as the display apparatus 100.

The technique according to the first embodiment and the second embodiment enables the display apparatus 100 to display, for example, imaging range information such as an imaging position of an endoscope or an endoscope capsule. In such a case, the first image may be, for example, an X-ray photograph, a CT image, or the like.

The display system 1 may comprise the display apparatus 100 and a plurality of external devices. In possible situations, a plurality of users may use the respective display apparatuses 100.

The processes illustrated in the flowcharts and the steps in each of the processes may be executed in different orders, and additions or deletions may be made to the processes and the steps. The processes are executed by respective programs each stored on the display apparatus 100, the surveillance camera 200, the drone 300, or the navigation unit 410. Each program may be pre-stored on the display apparatus 100, the surveillance camera 200, the drone 300 or the navigation unit 410 or recorded in another recording medium. Various methods may be used for the recording. For example, the recording may be executed before shipment, or a distributed recording medium may be used for the recording, or a communication line such as the Internet may be utilized for the recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus that combines images into a single frame of reference, the display apparatus comprising:
    a first camera that acquires a first image;
    a communication interface that is communicatively coupled to a second camera;
    a display; and
    a processor that is communicatively coupled to the first camera, the communication interface and the display, wherein the processor:
    receives the first image from the first camera,
    determines a first imaging range of the first image in a first frame of reference,
    receives, using the communication interface, information from the second camera,
    calculates a second imaging area of the second camera in a second frame of reference based on the information, the second imaging area included in the first imaging range,
    superimposes the second imaging area onto the first frame of reference to identify a surveillance area of the second camera, and
    displays, on the display, the surveillance area of the second camera as a superimposed display image on the first image.

2. The display apparatus according to claim 1, wherein the superimposed display image is filled in.

3. The display apparatus according to claim 1, wherein the information is received in response to a request from the display apparatus.

4. The display apparatus according to claim 1, wherein on a condition that the second imaging area cannot be translated to the first frame of reference, the processor further generates the superimposed display image by superimposing an auxiliary display image indicative that the surveillance area is not included in the first imaging range.

5. The display apparatus according to claim 1, wherein the processor translates the second imaging area into the first frame of reference to identify a surveillance area based on at least one of a position, an angle of view, an imaging direction, and an imaging height of the display apparatus at least at a time when the first image is acquired.

6. The display apparatus according to claim 1, wherein the camera acquires the first image in a direction of a field of vision of a user.

7. The display apparatus according to claim 1, wherein the display apparatus is an eyeglass type terminal.

8. The display apparatus according to claim 1, wherein the second camera is mounted to a drone that can perform imaging while flying.

9. The display apparatus according to claim 1, wherein the second camera is a surveillance camera mounted to a building.

10. The display apparatus according to claim 1, wherein the translation is performed based on at least one of a position, an angle of view, an imaging direction, and an imaging height of the second camera at a time when the information is acquired.

11. A display system that combines images into a single frame of reference, the display system comprising:
    a display apparatus; and
    an external camera that acquires an external image,
    wherein a processor of the display apparatus:
    receives a first image from a first camera,
    determines a first imaging range of the first image in a first frame of reference, receives information from the external camera,
    calculates a second imaging area of the external camera in a second frame of reference based on the information, the second imaging area included in the first imaging range,
    superimposes the second imaging area onto the first frame of reference to identify a surveillance area of the external camera, and
    displays, on a display of the display apparatus, the surveillance area of the external camera as a superimposed image on the first image.

12. The display system according to claim 11, wherein the display apparatus is an eyeglass type terminal.

13. The display system according to claim 11, wherein the external camera is mounted to a drone that can perform imaging while flying.

14. The display system according to claim 11, wherein the external camera is a surveillance camera mounted to a building.

15. A control method for combing images into a single frame of reference, the control method comprising:
    acquiring, by a processor, a first image from a first camera;
    determining, by the processor, a first imaging range of the first image in a first frame of reference;
    receiving, by the processor, information from a second camera;
    calculating, by the processor, a second imaging area of the second camera in a second frame of reference based on the information, the second imaging area included in the first imaging range;
    superimposing, by the processor, the second imaging area onto the first frame of reference to identify a surveillance area of the second camera; and
    displaying, by the processor, the surveillance area of the second camera as a superimposed image on the first image.

16. The method according to claim 15, wherein the processor is included in an eyeglass type terminal.

17. The method according to claim 15, wherein the second camera is mounted to a drone that can perform imaging while flying.

18. The method according to claim 15, wherein the second camera is a surveillance camera mounted to a building.

* * * * *